(12) United States Patent
Tissenier et al.

(10) Patent No.: US 10,690,632 B2
(45) Date of Patent: Jun. 23, 2020

(54) ULTRASOUND PROBE FOR A BORE, EQUIPPED WITH AN OFFCENTRING DEVICE

(71) Applicants: Airbus Operations S.A.S., Toulouse (FR); AIRBUS SAS, Blagnac (FR)

(72) Inventors: Alain Tissenier, Toulouse (FR); Aurelien Rautureau, Blagnac (FR)

(73) Assignees: Airbus Operations S.A.S. (FR); AIRBUS SAS (FR)

( * ) Notice: Subject to any disclaimer, the term of this patent is extended or adjusted under 35 U.S.C. 154(b) by 237 days.

(21) Appl. No.: 15/923,418

(22) Filed: Mar. 16, 2018

(65) Prior Publication Data

US 2018/0275103 A1   Sep. 27, 2018

(30) Foreign Application Priority Data

Mar. 24, 2017 (FR) ...................... 17 52460

(51) Int. Cl.
| | | |
|---|---|---|
| G01N 29/04 | (2006.01) | |
| G01N 29/24 | (2006.01) | |
| G01N 29/22 | (2006.01) | |
| G01D 11/30 | (2006.01) | |
| G10K 11/00 | (2006.01) | |
| G01N 29/265 | (2006.01) | |
| G01N 29/28 | (2006.01) | |

(52) U.S. Cl.
CPC ............ *G01N 29/28* (2013.01); *G01D 11/30* (2013.01); *G01N 29/043* (2013.01); *G01N 29/221* (2013.01); *G01N 29/225* (2013.01); *G01N 29/24* (2013.01); *G01N 29/265* (2013.01); *G10K 11/004* (2013.01); *G01N 2291/023* (2013.01); *G01N 2291/044* (2013.01); *G01N 2291/101* (2013.01); *G01N 2291/2636* (2013.01)

(58) Field of Classification Search
CPC ...... G01D 11/30; G10K 11/004; G01N 29/28; G01N 29/043; G01N 29/221; G01N 2291/023; G01N 2291/044; G01N 2291/101; G01N 2291/2636
USPC ......................................................... 73/662
See application file for complete search history.

(56) References Cited

U.S. PATENT DOCUMENTS

| | | | |
|---|---|---|---|
| 4,142,154 | A | 2/1979 | Couchman |
| 4,388,831 | A | 6/1983 | Sherman |
| 4,407,157 | A | 10/1983 | Lichtenberg |

(Continued)

FOREIGN PATENT DOCUMENTS

| | | | |
|---|---|---|---|
| CN | 201053961 | * | 4/2008 |
| CN | 201053961 Y | | 4/2008 |

(Continued)

OTHER PUBLICATIONS

FR 1752459 Search Report dated Aug. 3, 2017.

(Continued)

*Primary Examiner* — Jacques M Saint Surin
(74) *Attorney, Agent, or Firm* — Lerner, David, Littenberg, Krumholz & Mentlik, LLP

(57) ABSTRACT

An ultrasound probe for inspecting a bore opening onto a peripheral surface includes an offcentring device which includes at least two strips which are elastically deformable, connected to the ultrasound probe and configured to keep the emission head of the ultrasound probe pressed firmly against the wall of the bore that is to be inspected.

10 Claims, 3 Drawing Sheets

(56) References Cited

U.S. PATENT DOCUMENTS

| | | | |
|---|---|---|---|
| 4,836,028 A * | 6/1989 | Voituriez | G01L 9/0002 338/4 |
| 5,469,744 A | 11/1995 | Patton et al. | |
| 5,892,162 A | 4/1999 | Spinks et al. | |
| 6,088,923 A * | 7/2000 | Guerin | G01B 11/2408 33/542 |
| 6,354,148 B2 | 3/2002 | Sato et al. | |
| 9,518,851 B2 | 12/2016 | Bergman et al. | |
| 2004/0020296 A1* | 2/2004 | Moles | G01N 29/0609 73/627 |
| 2005/0183739 A1 | 8/2005 | McDermott et al. | |
| 2007/0256862 A1* | 11/2007 | Lund | G01N 29/04 175/39 |
| 2013/0220018 A1 | 8/2013 | Kollgaard et al. | |
| 2014/0352439 A1* | 12/2014 | Scaccabarozzi | G01N 29/04 73/632 |

FOREIGN PATENT DOCUMENTS

| | | |
|---|---|---|
| FR | 2696833 A1 | 4/1994 |
| FR | 2779524 A1 | 12/1999 |
| JP | H04276547 A | 10/1992 |
| JP | 2002048528 A | 2/2002 |

OTHER PUBLICATIONS

FR 1752460 Search Report dated Jul. 31, 2017.
Tissenier et al., U.S. Appl. No. 15/923,535, filed Mar. 16, 2018, titled "Ultrasound Probe for a Bore, Equipped With a Coupling Support".

* cited by examiner

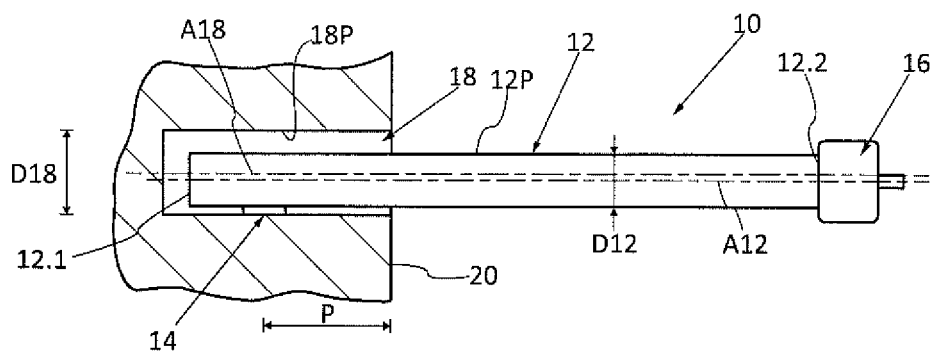
Fig. 1
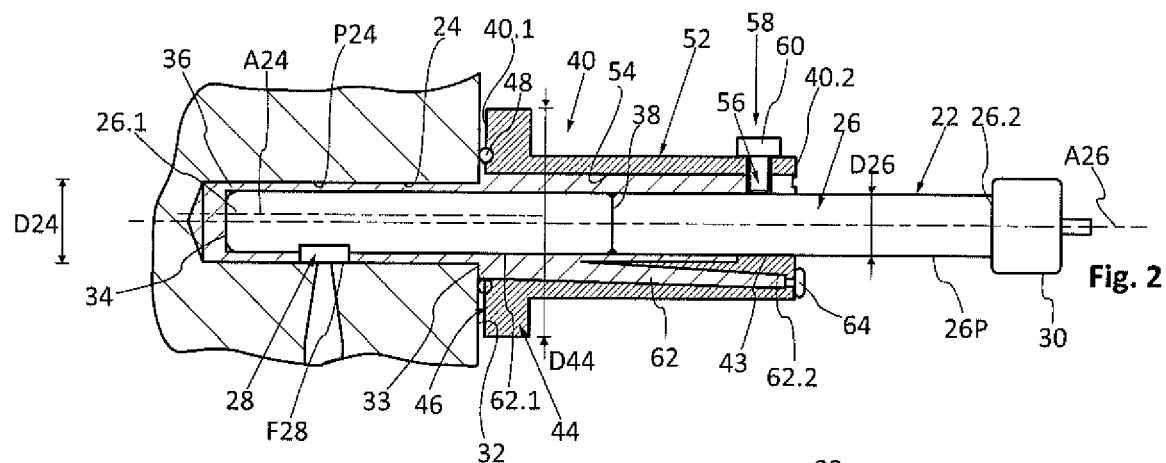
Fig. 2
Fig. 3
Fig. 4
Fig. 5A  Fig. 5B  Fig. 5C

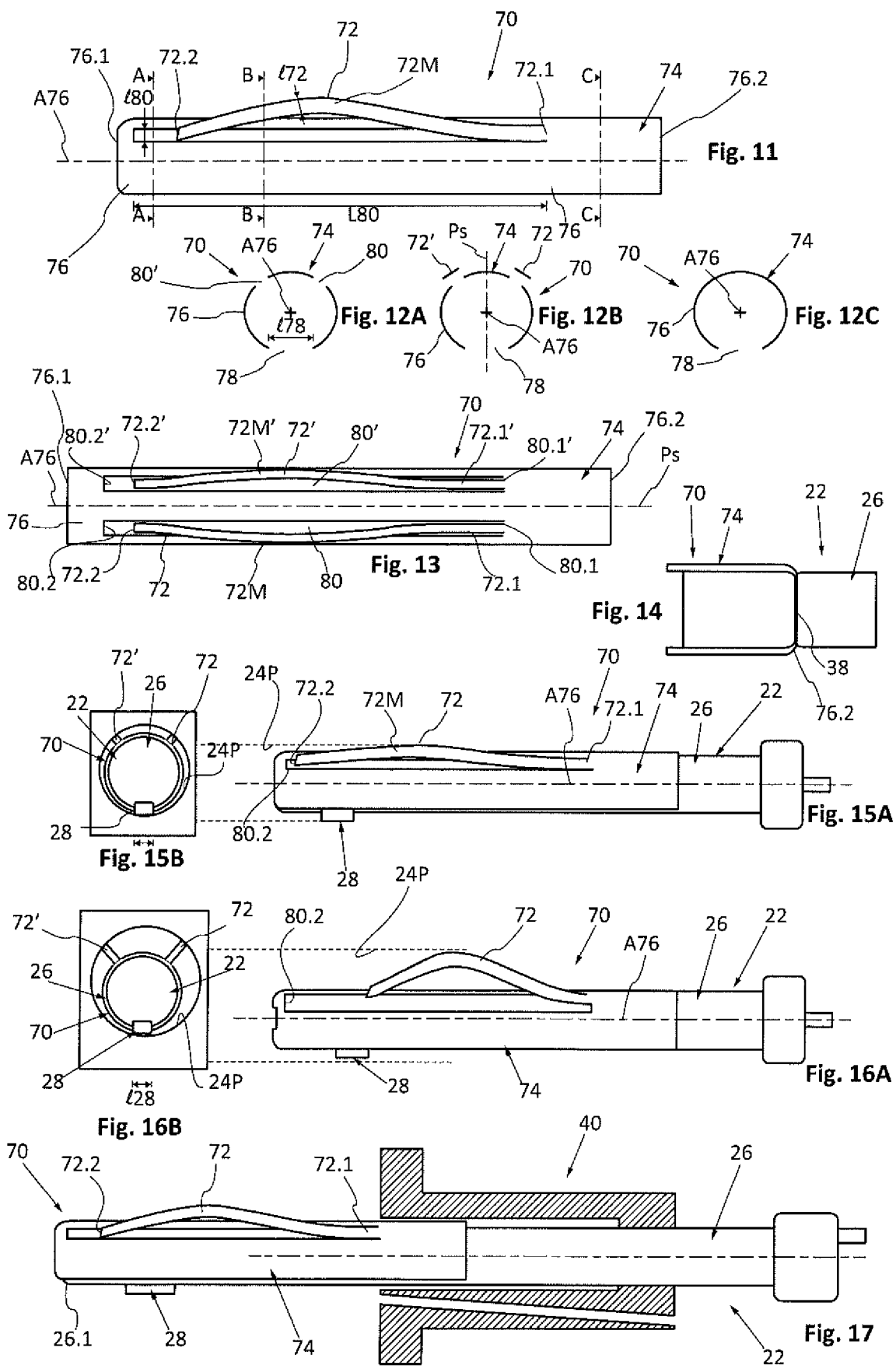

ULTRASOUND PROBE FOR A BORE, EQUIPPED WITH AN OFFCENTRING DEVICE

FIELD OF THE INVENTION

The present invention relates to an ultrasound probe for a bore, equipped with an offcentring device.

BACKGROUND OF THE INVENTION

As illustrated in FIG. 1, an ultrasound probe 10 for a bore comprises:
- a body 12 which has a cylindrical side wall 12P, with an axis A12 and a substantially constant diameter D12, that extends from a first end 12.1 to a second end 12.2,
- an emission head 14 that protrudes relative to the cylindrical side wall 12P of the body 12 and is positioned in proximity to the first end 12.1, and
- a connection system 16 positioned at the second end 12.2.

Such an ultrasound probe 10 is used to inspect a bore 18 having a cylindrical side wall 18P that has an axis A18 and a diameter D18 and opens onto a face 20.

The diameter D12 of the body 12, increased by the height of the emission head 14, needs to be substantially equal to the diameter D18 of the bore 18 that is to be inspected.

If the diameter of the ultrasound probe 10 is not suited to that of the bore 18 that is to be inspected then it is very difficult, throughout the entire inspection of the bore 18, to keep:
- the emission head 14 of the ultrasound probe 10 in contact with the cylindrical lateral wall 18P of the bore 18, with constant pressure,
- the axis A12 of the body 12 of the ultrasound probe 10 parallel to the axis A18 of the bore 18.

Therefore, in order not to impair the quality and repeatability of the inspection, it is necessary to provide an ultrasound probe 12 of a diameter suited to that of the bore 18 that is to be inspected.

The need to employ as many ultrasound probes as there are different diameters of bore to be inspected is impractical, and requires costly investment.

BRIEF SUMMARY OF THE INVENTION

Aspects of the present invention may overcome the drawbacks of the prior art.

The invention relates to an ultrasound probe for inspecting a bore opening onto a peripheral surface, the ultrasound probe comprising:
- a body which has a cylindrical side wall that extends from a first end to a second end,
- an emission head positioned on the cylindrical side wall in proximity to the first end.

According to an embodiment of the invention, the ultrasound probe comprises an offcentring device which comprises at least two strips which can deform elastically along the radial direction and a support to which the strips are connected and which is configured to be fixed removably on the body of the ultrasound probe, the strips being positioned on the support so as to exert a force, oriented radially and passing through the emission head, on the ultrasound probe.

According to another feature, the support is a split ring which has an axis parallel to the axis of the body of the ultrasound probe.

According to one embodiment, the split ring is made of material allowing it to be deformed so as to clip onto the body of the ultrasound probe.

According to another feature, the offcentring device comprises a system for locking the support in rotation with respect to the body of the ultrasound probe.

According to one embodiment, the support is a split ring which has a slot of which the width is substantially equal to the width of the emission head of the ultrasound probe, the strips and the slot being distributed regularly over the circumference of the support.

According to another feature, the offcentring device comprises a system for locking the support relative to the body of the ultrasound probe along a direction parallel to the axis of the body of the ultrasound probe.

According to another feature, each strip comprises a first end connected to the support, a free second end, a medial portion and extends along a direction parallel to the axis of the body of the ultrasound probe, each strip having a U-shaped curved shape, the medial part being separated from the axis of the support by a distance greater than that between the axis of the support and the first end of each strip.

In one configuration, the support comprises, for each strip, an opening making it possible to accommodate the strip, when it is compressed, against the ultrasound probe.

According to one embodiment, each opening has an approximately rectangular shape which extends from a first end to a second end, each strip comprising a first end connected to the first end of the opening, each opening having a width equal to or slightly greater than the width of each strip and a length equal to or slightly greater than the length of each strip.

In one orientation, the strips are connected to the support so that the second ends of the strips are closer to the first end of the body of the ultrasound probe than the first ends of the strips.

Other characteristics and advantages will emerge from the following description of the invention, which is given solely by way of example, with reference to the appended drawings, in which:

BRIEF DESCRIPTION OF THE DRAWINGS

FIG. 1 is a side view of an ultrasound probe in a bore, which illustrates the prior art, FIG. 2 is a side view of an ultrasound probe equipped with a coupling support and positioned in a bore, which illustrates one embodiment of the invention, FIG. 3 is a perspective view of the ultrasound probe shown in FIG. 2, FIG. 4 is a cross section of a coupling support, which illustrates one embodiment of the invention, FIG. 5A is a view along the arrow A of FIG. 4, FIG. 5B is a cross section along the line B-B of FIG. 4, FIG. 5C is a cross section along the line C-C of FIG. 4, FIGS. 6A, 6B, 7A, 7B, 8, 9A and 9B represent an overview which illustrates the use of an ultrasound probe equipped with a coupling support, FIG. 11 is a side view of an offcentring device, which illustrates one embodiment of the invention, FIG. 12A is a cross section along the line A-A of FIG. 11, FIG. 12B is a cross section along the line B-B of FIG. 11, FIG. 12C is a cross section along the line C-C of FIG. 11, FIG. 13 is a plan view of the offcentring device shown in FIG. 11, FIG. 14 is a cross section of one end of the offcentring device mounted on an ultrasound probe, which illustrates a detail of the embodiment shown in FIG. 10, FIG. 15A is a side view of an ultrasound probe equipped with an offcentring device deformed as if the ultrasound probe were introduced into a first bore with a small diameter, FIG. 15B is a front view of the ultrasound probe of FIG. 15A introduced into the first bore with the small diameter, FIG. 16A is a side view of an ultrasound probe equipped with an offcentring device deformed as if the ultrasound probe were introduced into a second bore with a diameter greater than that of the first bore, FIG. 16B is a front view of the ultrasound probe of FIG. 16A introduced into the second bore, FIG. 17 is a side view of an ultrasound probe equipped with a coupling support and an offcentring device, which illustrates one embodiment of the invention.

DETAILED DESCRIPTION

Figures 6A, 6B:
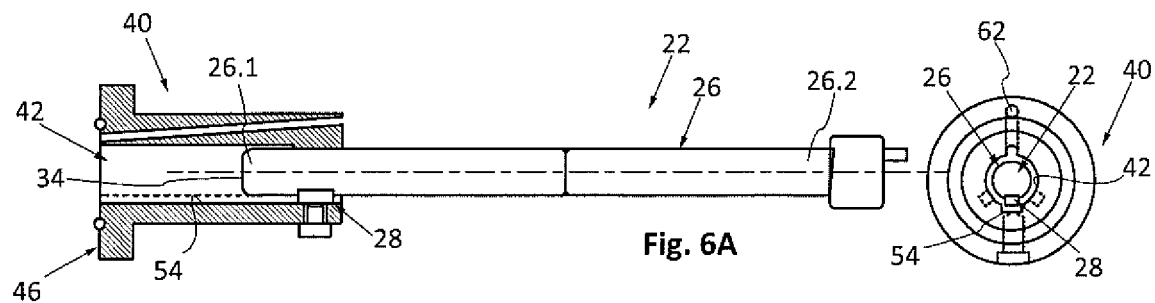

An ultrasound probe 22 for inspecting a bore 24 comprises:
- a body 26 which has a cylindrical side wall 26P, with an axis A26 and a substantially constant diameter D26, that extends from a first end 26.1 to a second end 26.2,
- an emission head 28 that protrudes relative to the cylindrical side wall 26P of the body 26 and is positioned in proximity to the first end 26.1, and
- a connection system 30 positioned at the second end 26.2.

For the rest of the description, a longitudinal direction is parallel to the axis A26 and a radial direction is perpendicular to the axis A26. A transverse plane is a plane perpendicular to the axis A26.

A bore is intended to mean a cylindrical hole, which may be blind, whatever its embodiment. The bore 24 comprises a cylindrical side wall P24, with an axis referenced A24 and a diameter D24. The bore 24 opens onto a planar peripheral surface 32 that extends over the perimeter of the bore 24. According to one configuration, the peripheral surface 32 is perpendicular to the axis A24 of the bore. The bore 24 also comprises a peripheral edge 33, which corresponds to the junction between the peripheral side wall P24 and the peripheral surface 32.

According to one embodiment, the first end 26.1 of the body 26 of the ultrasound probe 22 comprises a planar end face 34 perpendicular to the axis A26 and a rounded peripheral edge 36 joining the end face 34 to the cylindrical side wall 26P.

As illustrated in FIG. 14, the body 26 comprises a peripheral channel 38 positioned in a transverse plane.

According to one embodiment, the emission head 28 is a parallelepiped partially embedded in the body 26 of the ultrasound probe, one of the faces of the parallelepiped, referred to as the contact face F28, being arranged in a plane substantially perpendicular to a direction which is radial and oriented in the direction of the cylindrical side wall P24 of the bore 24 during inspection.

According to one embodiment of the invention, which is shown in FIGS. 2 to 4, 5A to 5C, the ultrasound probe 22 is equipped with a coupling support 40 configured to be fitted over the body 26 of the ultrasound probe 22 and to be pressed against the peripheral surface 32 in order to close the bore 24.

This coupling support 40 comprises a first face 40.1, a second face 40.2, a through-orifice 42 which extends between the first and second faces 40.1 and 40.2 and has an axis A42 and a diameter D42. This diameter D42 is equal to or greater than the diameter D26 of the body 26 of the ultrasound probe 22, in order to allow the coupling support 40 to slide along the body 26 of the ultrasound probe. The through-orifice 42 comprises at least one portion 43 with a diameter equal to that of the body 26 of the ultrasound probe.

Thus, the axis A26 of the body 26 of the ultrasound probe 22 coincides with the axis A42 of the through-orifice 42.

The first face 40.1 of the coupling support 40, also referred to as the contact face, is perpendicular to the axis A42 of the through-orifice 42 and is configured to be pressed against the peripheral surface 32. Consequently, during operation, when the contact face 40.1 of the coupling support 40 is pressed against the peripheral surface 32 of the bore 24, the axis A26 of the body 26 of the ultrasound probe 22 is parallel to the axis A24 of the bore 24.

The coupling support 40 comprises a collar 44, which extends along a direction perpendicular to the axis A42 of the through-orifice 42 and has a first face 46, which corresponds to the contact face 40.1 of the coupling support 40 and is perpendicular to the axis A42. The contact face 40.1 has an external diameter D44 greater than the diameter D24 of the bore 24 to be inspected, so that the contact face 40.1 is pressed against the peripheral surface 32 over the entire perimeter of the bore 24 during operation, so as to close the bore 24.

So that the coupling support 40 can adapt to different diameters of a bore 24, the diameter D44 is greater than or equal to 2 times the diameter D42 of the through-orifice 42.

To give an order of magnitude, the collar has a thickness (dimension measured along a direction parallel to the axis A42) of about 1 to 2 cm.

In order to reinforce the sealing, the coupling support 40 comprises a seal 48 intended to be positioned between the contact face 40.1 of the coupling support 40 and the peripheral surface 32 of the bore 24.

According to one embodiment, the seal 48 is an O-ring seal and the contact face 40.1 comprises an annular channel 50 at a distance from the through-orifice 42 (and preferably coaxial with the through-orifice 42), the said channel 50 being configured to partially accommodate and hold the seal 48.

The coupling support 40 comprises a tubular portion 52 coaxial with the through-orifice 42, which has a first end connected to the collar 44 and a second end which corresponds to the second face 40.2 of the coupling support 40. This tubular portion 52 has an internal diameter equal to the diameter D42 of the through-orifice 42.

According to one embodiment, the through-orifice 42 has a diameter D42 slightly greater than the diameter D26 of the body 26 of the ultrasound probe 22 and comprises only one portion 43, the diameter of which is equal to the diameter D26 of the body 26 of the ultrasound probe and which is positioned adjacent to the second face 40.2 of the coupling support that is the farthest from the contact face 40.1.

The function of the tubular portion 52 is to increase the guiding length of the through-orifice 42. In order to optimize the positioning of the body 26 of the ultrasound probe 22 in the bore 24, the through-orifice 42 must have a length (dimension measured along a direction parallel to the axis A42) greater than or equal to 5 times the diameter D26 of the body 26 of the ultrasound probe.

In order to allow the ultrasound probe 22 to slide in the through-orifice 42 of the coupling support 40, the through-orifice 42 comprises at least one longitudinal groove 54, which extends over the entire length of the through-orifice 42 and the cross section of which is configured in order to allow the emission head 28 to pass through. For each groove 54, the coupling support 40 comprises a plug 56 for closing the groove, so that a coupling liquid cannot pass from the first face 40.1 to the second face 40.2 of the coupling support 40 through the longitudinal groove 54.

The coupling support 40 comprises a system 58 for locking the ultrasound probe 22 relative to the coupling support 40 along a direction parallel to the axis A42 of the through-orifice 42. This locking system 58 is configured to occupy a free state, in which the ultrasound probe 22 can slide relative to the coupling support 40, and a blocked state, in which the ultrasound probe 22 cannot slide relative to the coupling support 40. This locking system 58 makes it possible to adjust a distance between the emission head 28 and the contact face 40.1 of the coupling support 40 and to keep this distance constant. Thus, during inspection, the emission head 28 remains at a predefined and constant depth in the bore 24.

According to one embodiment, the coupling support 40 comprises a pressure screw 60 which is screwed into a radial tapped hole that opens into the through-orifice 42. Thus, when the pressure screw 60 is screwed in and in contact with the ultrasound probe 22, it locks the said ultrasound probe 22, which corresponds to the blocked state. When the pressure screw 60 is no longer in contact with the ultrasound probe 22, the latter can slide relative to the coupling support 40, which corresponds to the free state.

Advantageously, the pressure screw 60 is dimensioned and positioned so as to close the longitudinal groove 54 in the blocked state and fulfil the function of a plug 56, as illustrated in FIG. 5C.

The coupling support 40 comprises a coupling fluid feed conduit 62 which has a first end 62.1 that opens onto the contact face 40.1 and the through-orifice 42 (as illustrated in FIGS. 2 and 5A), and a second end 62.2 positioned so as to make it possible to supply the feed conduit 62 when the coupling support 40 is pressed against the peripheral surface 32 of the bore 24. According to one configuration, the feed conduit 62 is straight and the second end 62.2 is positioned on the second face 40.2 of the coupling support 40. Preferably, the feed conduit 62 is diametrically opposite the longitudinal groove 54. The coupling support 40 comprises a plug 64 for closing the feed conduit 62.

The coupling support 40 may be made of metal or plastic, and produced by any suitable means.

The operation of the ultrasound probe 22 equipped with a coupling support 40 is described with reference to FIGS. 6A, 6B, 7A, 7B, 8, 9A and 9B.

First, the ultrasound probe 22 is introduced into the through-orifice 42 of the coupling support 40 while positioning the emission head 28 in the longitudinal groove 54, as illustrated in FIGS. 6A and 6B.

Figures 7A, 7B:
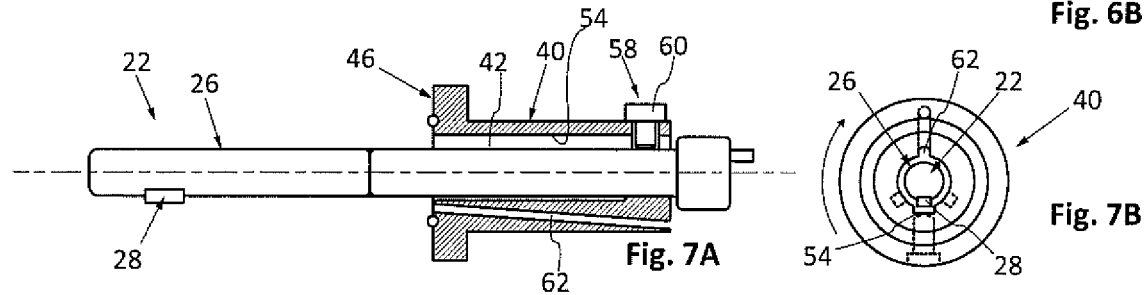

When the emission head 28 has passed through the coupling support 40, the coupling support 40 pivots around the ultrasound probe 22 so as to position the emission head 28 in extension of the coupling fluid feed conduit 62, as illustrated in FIGS. 7A and 7B.

Next, the position of the emission head 28 relative to the contact face 40.1 of the coupling support 40 is adjusted. According to one operating mode, an adjustment ring 66 may be used.

Figure 8:
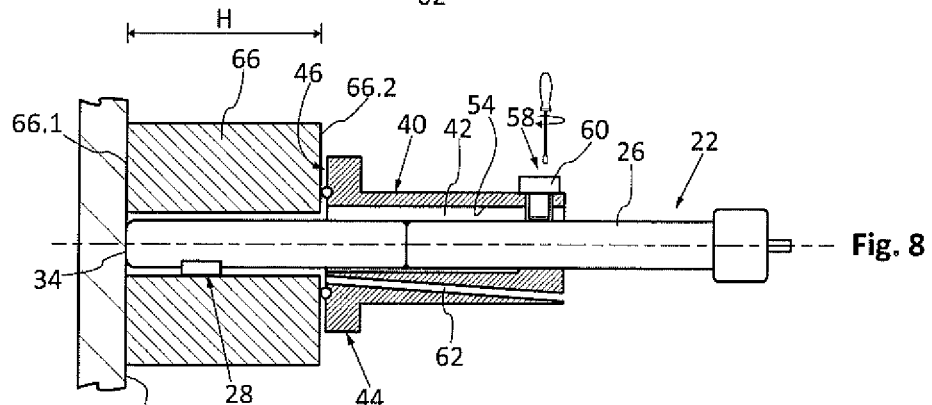

This adjustment ring 66 has an internal diameter allowing introduction of the ultrasound probe 22. As illustrated in FIG. 8, the height H of the adjustment ring 66 is selected as a function of the desired distance between the emission head 28 of the ultrasound probe 22 and the contact face 40.1 of the coupling support 40.

The adjustment method comprises a first step of positioning a first face 66.1 of the adjustment ring 66 against a reference surface 68, a second step of introducing the ultrasound probe into the adjustment ring 66 until its first end 26.1 is in contact with the reference surface 68, a third step of moving the coupling support 40 in translation along the body 26 of the ultrasound probe until the contact face 40.1 of the coupling support 40 is in contact with the second face 66.2 of the adjustment ring 66, and a fourth step of locking the ultrasound probe relative to the coupling support 40 by tightening the pressure screw 60, as illustrated by FIG. 8.

Figures 9A, 9B:
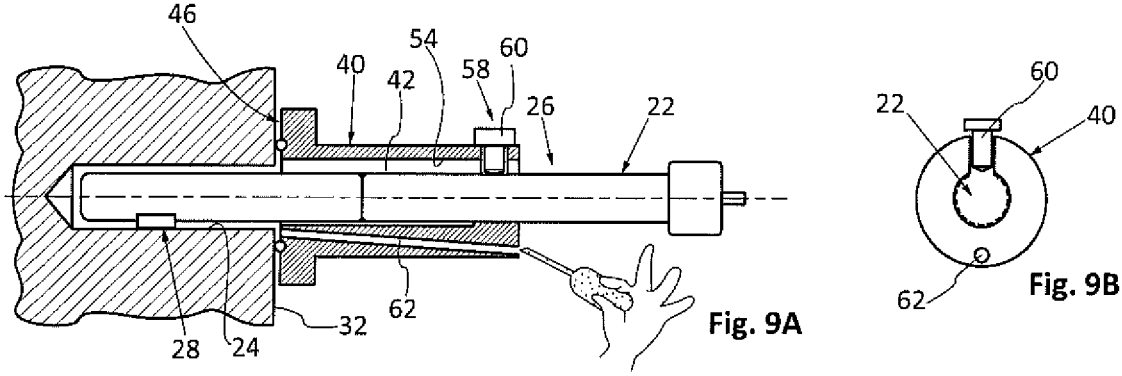

Next, the ultrasound probe 22 is introduced into the bore 24 to be inspected, and the contact face 40.1 of the coupling support 40 is pressed against the peripheral surface 32 of the bore, as illustrated in FIG. 9A. The longitudinal groove 54 is closed by the pressure screw 60, as illustrated in FIG. 9B. A coupling liquid is introduced through the feed conduit 62 into the bore 24 to be inspected.

When the bore 24, the feed conduit 62 and the longitudinal groove 54 are filled with coupling liquid, the plug 64 is fitted.

The bore 24 is then inspected by pivoting the ultrasound probe 22 while keeping the contact face 40.1 of the coupling support 40 pressed against the peripheral surface 32 of the bore 24.

The coupling support makes it possible:
to keep the ultrasound probe 22 parallel to the axis A24 of the bore 24 to be inspected,
to inspect the bore 24 at different depths,
to limit as far as possible the consumption of coupling liquid, and
to keep the coupling liquid in the bore in order to ensure constant and uniform ultrasound coupling during the inspection.

According to one feature of the invention, the ultrasound probe 22 is equipped with an offcentring device 70, as illustrated in FIGS. 10, 11, 12A to 12C, 13, 14, 15A, 15B, 16A and 16B.

The offcentring device 70 comprises at least two strips 72, 72' which can deform elastically along the radial direction when the offcentring system is mounted on the body 26 of an ultrasound probe 22, and a support 74 to which the strips 72, 72' are connected and which is configured to be fixed removably on the body 26 of an ultrasound probe 22.

The strips 72, 72' are positioned on the support 74 so as to exert a force, oriented radially and passing through the emission head 28, on the ultrasound probe 22. Thus, during operation, the emission head 28 is pressed against the cylindrical side wall 24P of the bore 24.

The support 74 is a split ring 76, split over its entire length, which has an axis referenced A76 and a diameter, in the undeformed state, equal to or slightly smaller than that of the body 26 of the ultrasound probe 22. When the support 74 is mounted on the ultrasound probe 22, the axis A76 is parallel to the axis A26 of the body 26 of the ultrasound probe.

According to one embodiment, the split ring 76 is made of a material allowing it to be deformed so as to clip onto the body 26 of the ultrasound probe 22.

The split ring 76 comprises a slot 78 (shown in FIGS. 12A to 12C) which has a width 178 less than the diameter D26 of the body 26 of the ultrasound probe 22, in order to make it possible to hold the split ring 76 on the body 26 of the ultrasound probe 22, and greater than a given value in order to make it possible for the emission head 28 of the ultrasound probe 22 to pass through.

As a variant, the support 74 has a diameter equal to that of the body 26 of the ultrasound probe 22, and is substantially rigid. In this case, it is fitted onto the body 26 of the ultrasound probe 22 by sliding it from the first end 26.1 of the body 26.

The offcentring device comprises a system for locking the support 74 in rotation relative to the body 26 of the ultrasound probe 22. According to one embodiment, the slot 78 fulfils the function of the locking system, the width 178 of the slot 78 being substantially equal to the width 128 of the emission head 28.

The strips 72, 72' and the slot 78 are distributed regularly over the circumference of the support 74. Thus, during operation, the strips 72, 72' exert a force, oriented radially and passing through the emission head 28, on the ultrasound probe 22 in order to press the latter against the cylindrical side wall 24P of the bore to be inspected.

Preferably, the strips 72, 72' are identical and symmetrical with respect to a plane of symmetry Ps passing through the axis A76 of the support 76 and through the middle of the slot 78.

The offcentring device 70 comprises a system for locking the support 74 relative to the body 26 of the ultrasound probe 22 along a direction parallel to the axis A26 of the body 26 of the ultrasound probe.

According to one embodiment, the split ring 76 comprises a first end 76.1 which is curved in order to match the first end 26.1 of the body 26, and a second end 76.2 which is curved in order to be accommodated in the peripheral channel 38 provided on the body 26, as illustrated in FIG. 14. Thus, the split ring 76 has a length equal to the distance between the first end 26.1 and the peripheral channel 38 of the body 26 of the ultrasound probe.

Each strip 72, 72' comprises a first end 72.1, 72.1' connected to the support 74, a free second end 72.2, 72.2' and a medial portion 72M, 72M', and extends along a direction parallel to the axis A26 of the body 26 of the ultrasound probe 22. In a complementary fashion, for each strip 72, 72', the support 74 comprises an opening 80, 80' making it possible to accommodate the strip 72, 72' when it is compressed against the ultrasound probe. Each opening 80, 80' has an approximately rectangular shape, which extends from a first end 80.1, 80.1' to a second end 80.2, 80.2'.

For each strip 72, 72', the first end 72.1, 72.1' is connected to the first end 80.1, 80.1' of the corresponding opening 80, 80'.

Each opening 80, 80' has a width 180 equal to or slightly greater than the width 172 of each strip 72, 72'.

Each opening 80, 80' has a length L80 (distance between the first and second ends 80.1, 80.2) equal to or slightly greater than the length of each strip 72, 72' (distance between the first and second ends 72.1, 72.2 following the profile of the strip 72).

According to one embodiment, the strips 72, 72' and the support 74 have the same thickness (dimension measured along the radial direction) and are made in one piece.

Figure 10:
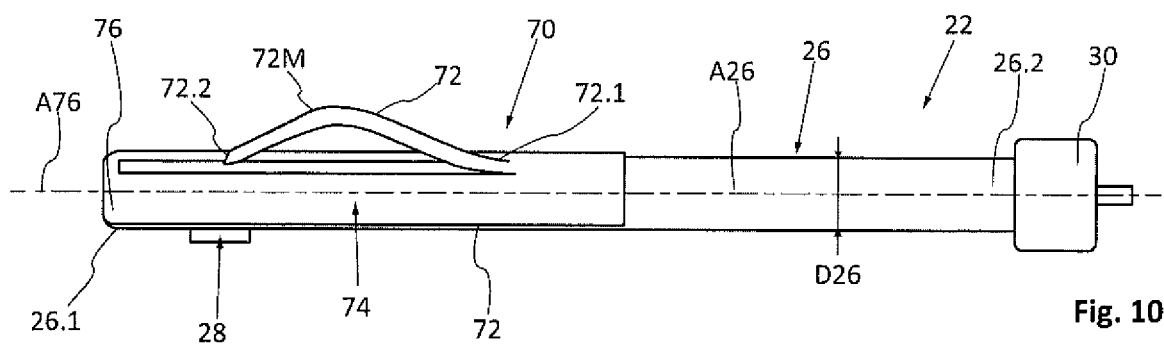
FIG. 10 is a side view of an ultrasound probe equipped with an offcentring device, which illustrates one embodiment of the invention.

In the undeformed state, each strip 72, 72' has a U-shaped curved shape, as illustrated in FIG. 10, the medial part 72M, 72M' being separated from the axis A76 of the support by a distance greater than that between the axis A76 of the support and the first and second ends of each strip 72, 72'. According to one configuration, the first and second ends of each strip 72, 72' are separated from the axis A76 by a distance equal to the radius of the support 74. The second ends 72.2, 72.2' of the strips 72, 72' are distanced from the second ends 80.2, 80.2' of the openings 80, 80'.

In the deformed state, the medial part 72M, 72M' is separated from the axis A76 by a distance substantially equal to the radius of the support 74, as illustrated in FIG. 15A. The second ends 72.2, 72.2' of the strips 72, 72' are close to the second ends 80.2, 80.2' of the openings 80, 80'.

According to one configuration, the strips 72, 72' are connected to the support 74 so that the second ends 72.2, 72.2' of the strips 72, 72' are closer to the first end 26.1 of the body 26 of the ultrasound probe than the first ends 72.1, 72.1' of the strips 72, 72' are.

The operation of offcentring device 70 is as follows:

The support 74 is mounted on the body 26 of the ultrasound probe 22. Once mounted, the support 74 is locked relative to the body 26 of the ultrasound probe 22.

The body 26 of the ultrasound probe is introduced into the bore 24. As illustrated in FIGS. 15B and 16B, the strips 72, 72' are compressed to a greater or a lesser extent depending on the diameter of the bore 24, 24'. In both cases, the strips 72, 72' exert a force on the ultrasound probe 22, which tends to press the emission head 28 against the cylindrical side wall 24P of the bore 24 to be inspected.

The offcentring device makes it possible:
to use a single ultrasound probe for inspecting different bore diameters,
to always keep the emission head 28 of the ultrasound probe 22 in contact with the wall of the bore 24, and to do so with a constant pressure.

According to one embodiment, which is shown in FIG. 17, the ultrasound probe 22 is equipped with a coupling support 40 and an offcentring system 70. In this case, the coupling support 40 comprises longitudinal grooves 54.1 and 54.2 for each strip 72, 72', as illustrated in FIGS. 5A and 5B.

The invention claimed is:

1. An ultrasound probe for inspecting a bore opening onto a peripheral surface, the ultrasound probe comprising:
    a body which has a cylindrical side wall that extends from a first end to a second end;
    an emission head positioned on the cylindrical side wall in proximity to the first end; and
    an offcentring device comprising a support and at least two strips configured to deform elastically along a radial direction and connected to the support, the support configured to be fixed removably on the body of the ultrasound probe, the at least two strips positioned on the support so as to exert a force, oriented radially and passing through the emission head, on the ultrasound probe.

2. The ultrasound probe according to claim 1, wherein the support is a split ring which has an axis parallel to the axis of the body of the ultrasound probe.

3. The ultrasound probe according to claim 2, wherein the split ring is made of material allowing it to be deformed so as to clip onto the body of the ultrasound probe.

4. The ultrasound probe according to claim 1, wherein the offcentring device comprises a system for locking the support in rotation with respect to the body of the ultrasound probe.

5. The ultrasound probe according to claim 4, wherein the support is a split ring which has a slot of which the width is substantially equal to the width of the emission head of the ultrasound probe, the strips and the slot being distributed regularly over the circumference of the support.

6. The ultrasound probe according to claim 1, wherein the offcentring device comprises a system for locking the support relative to the body of the ultrasound probe along a direction parallel to the axis of the body of the ultrasound probe.

7. An ultrasound probe for inspecting a bore opening onto a peripheral surface, the ultrasound probe comprising:
- a body which has a cylindrical side wall that extends from a first end to a second end;
- an emission head positioned on the cylindrical side wall in proximity to the first end; and
- an offcentring device which comprises at least two strips which can deform elastically along the radial direction and a support to which the strips are connected and which is configured to be fixed removably on the body of the ultrasound probe, the strips being positioned on the support so as to exert a force, oriented radially and passing through the emission head, on the ultrasound probe,
- wherein each strip comprises a first end connected to the support, a free second end, a medial portion and extends along a direction parallel to the axis of the body of the ultrasound probe, each strip having a U-shaped curved shape, the medial part being separated from the axis of the support by a distance greater than that between the axis of the support and the first end of each strip.

8. The ultrasound probe according to claim 1, wherein the support comprises, for each strip, an opening making it possible to accommodate the strip, when it is compressed, against the ultrasound probe.

9. An ultrasound probe, for inspecting a bore opening onto a peripheral surface, the ultrasound probe comprising:
- a body which has a cylindrical side wall that extends from a first end to a second end;
- an emission head positioned on the cylindrical side wall in proximity to the first end; and
- an offcentring device which comprises at least two strips which can deform elastically along the radial direction and a support to which the strips are connected and which is configured to be fixed removably on the body of the ultrasound probe, the strips being positioned on the support so as to exert a force, oriented radially and passing through the emission head, on the ultrasound probe
- wherein the support comprises, for each strip, an opening making it possible to accommodate the strip, when it is compressed, against the ultrasound probe, and
- wherein each opening has an approximately rectangular shape which extends from a first end to a second end, each strip comprising a first end connected to the first end of the opening, each opening having a width equal to or slightly greater than the width of each strip and a length equal to or slightly greater than the length of each strip.

10. The ultrasound probe according to claim 7, wherein the strips are connected to the support so that the second ends of the strips are closer to the first end of the body of the ultrasound probe than the first ends of the strips.

* * * * *